No. 738,783. Patented September 15, 1903.

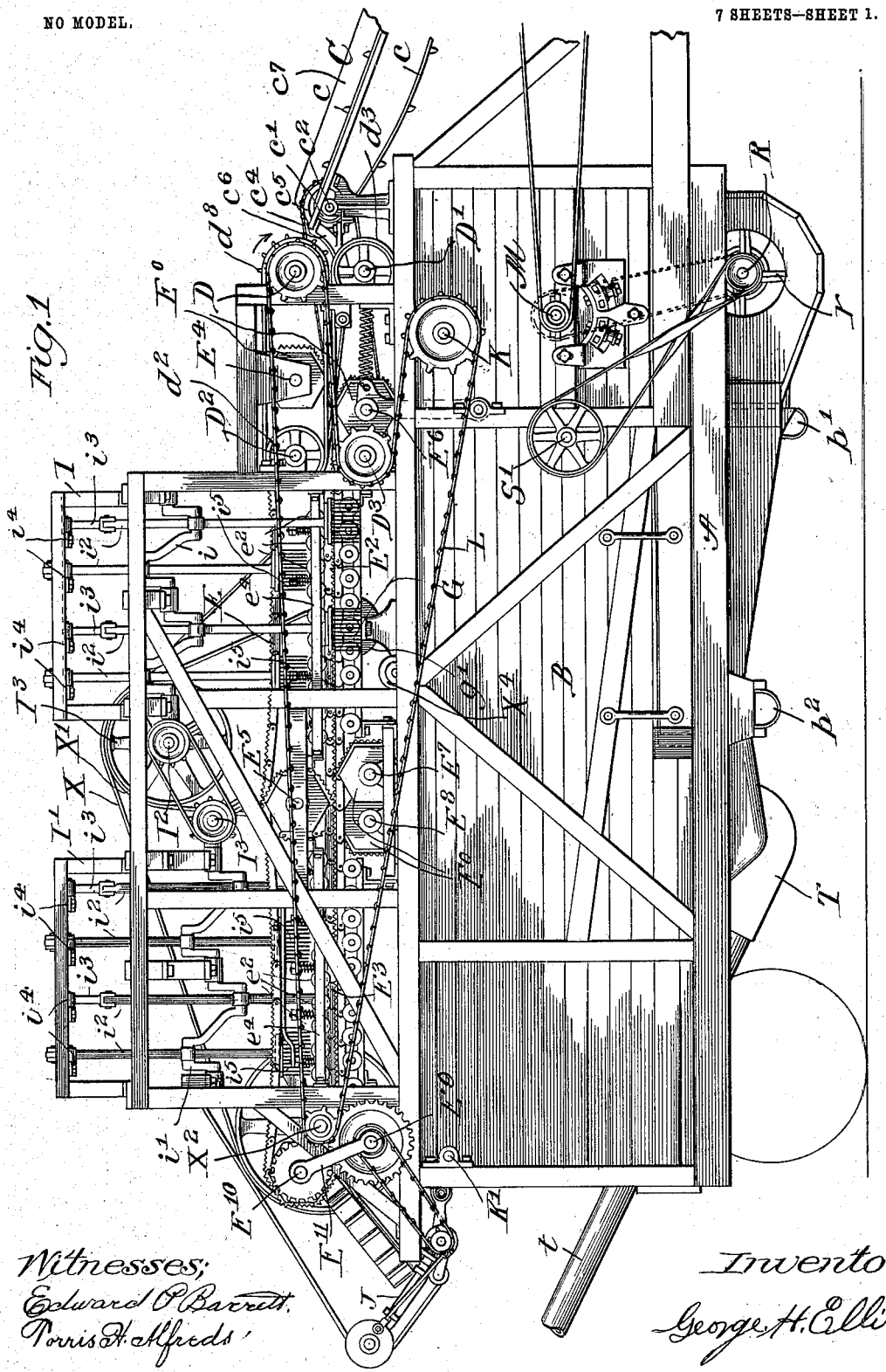

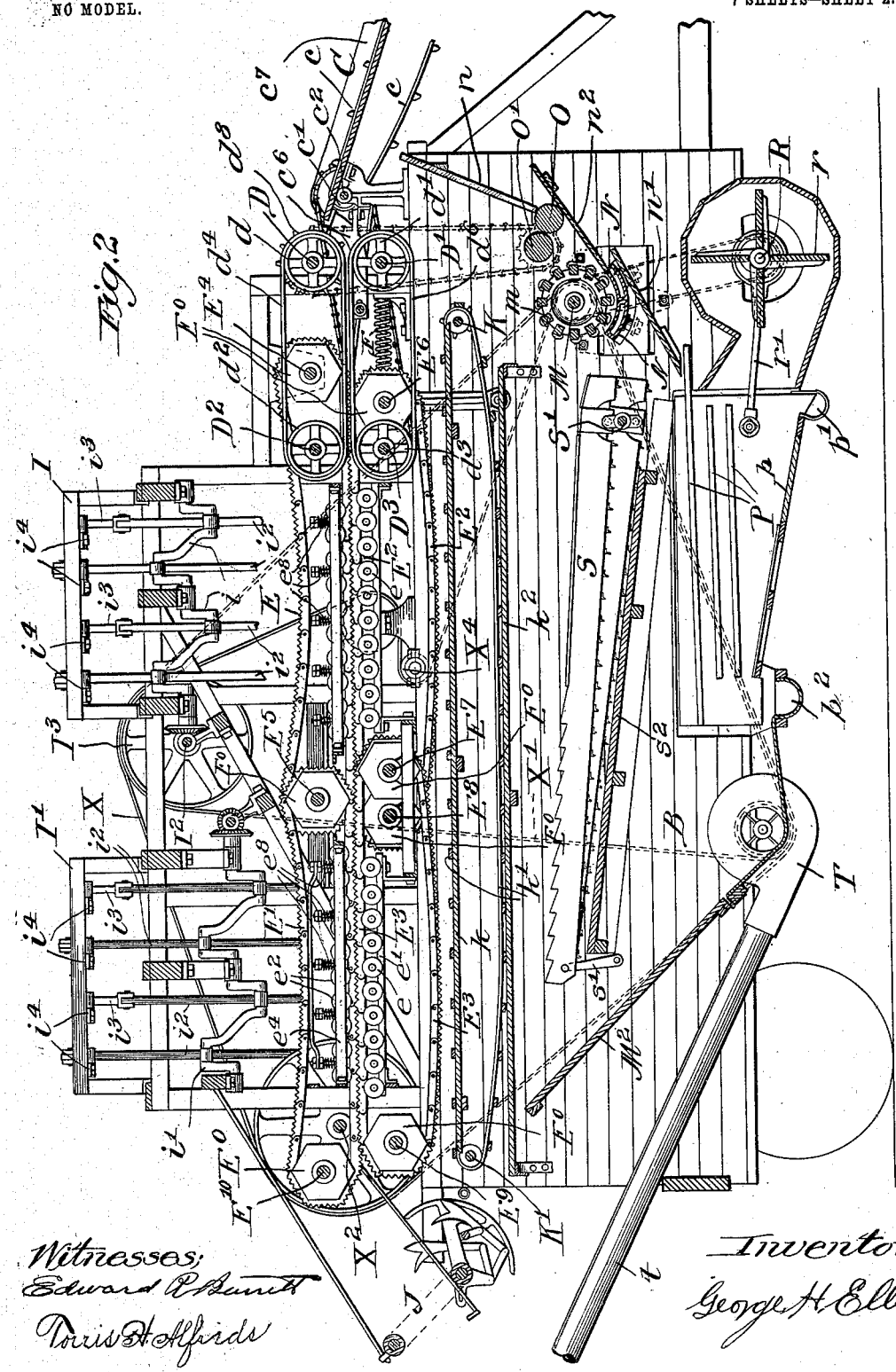

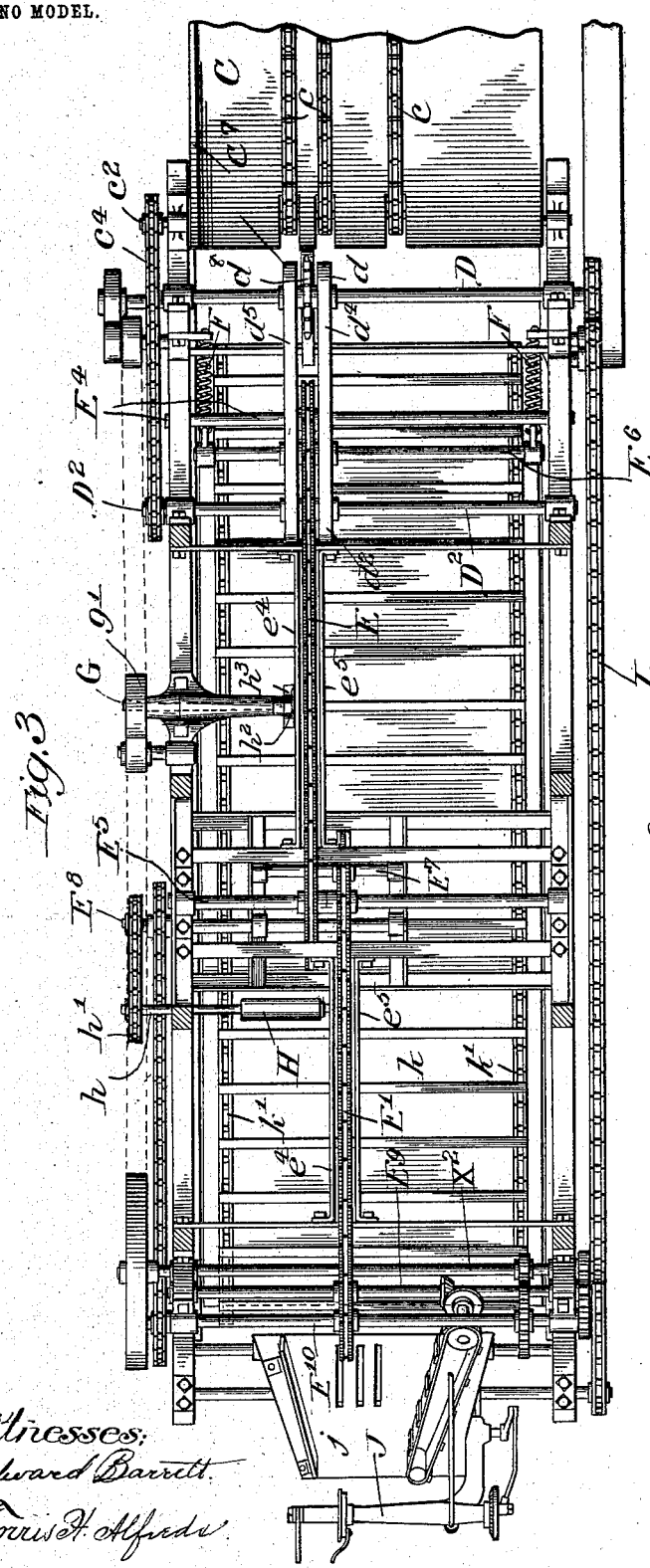
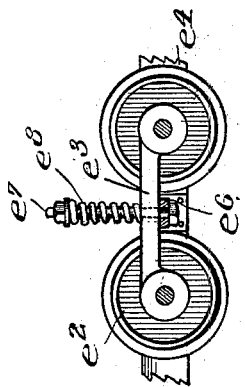
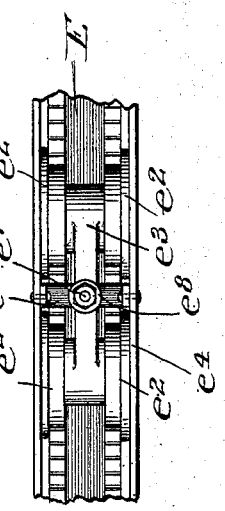

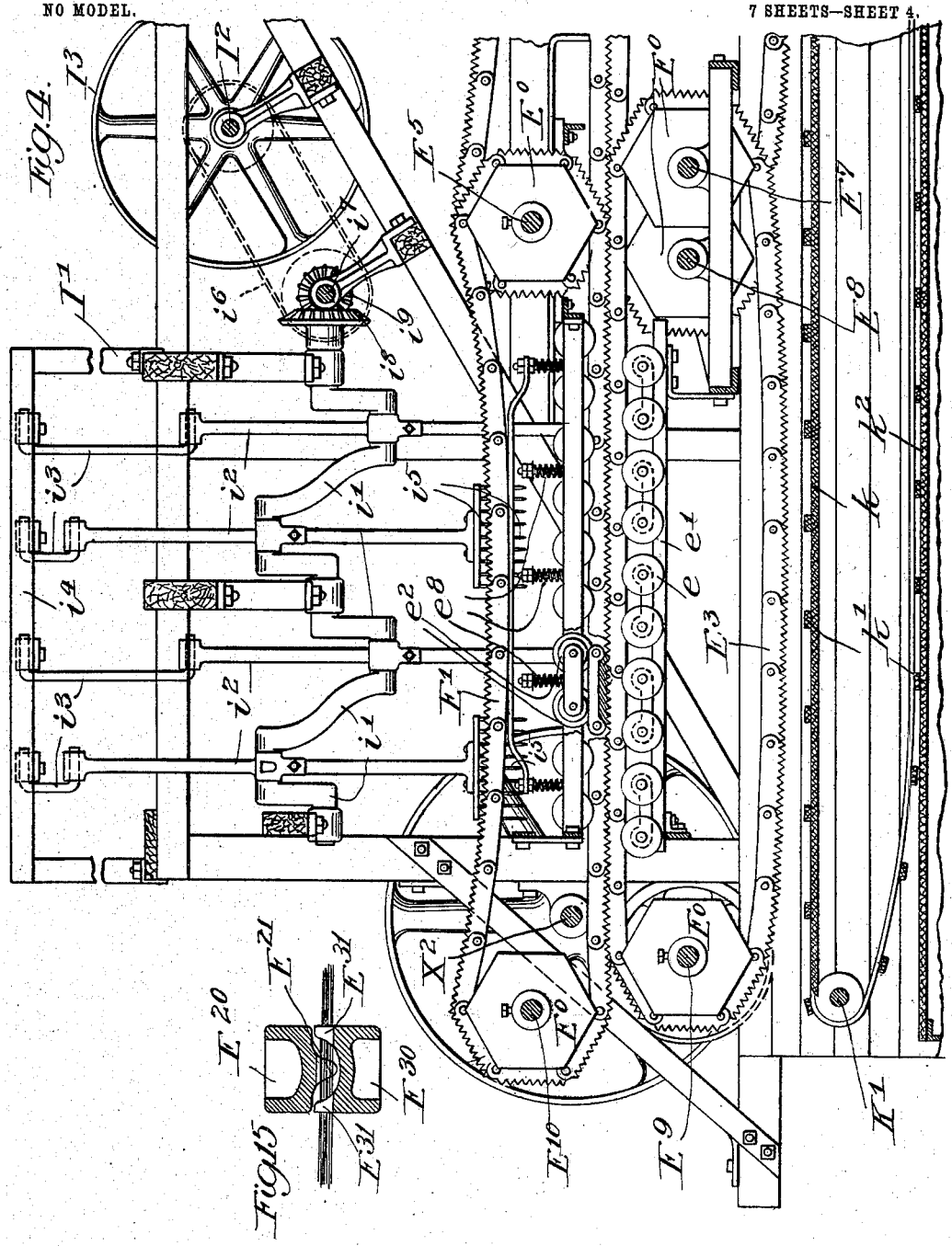

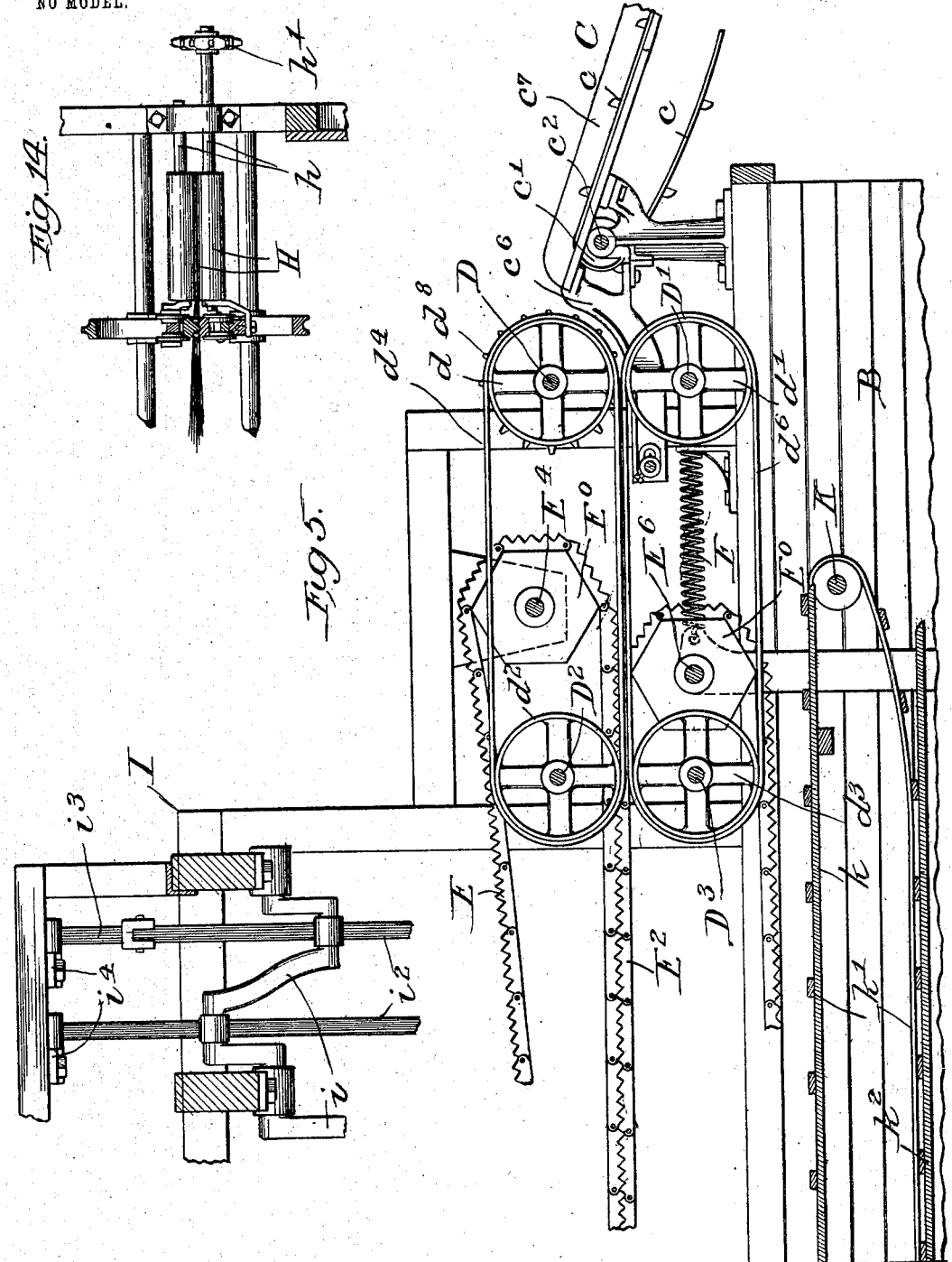

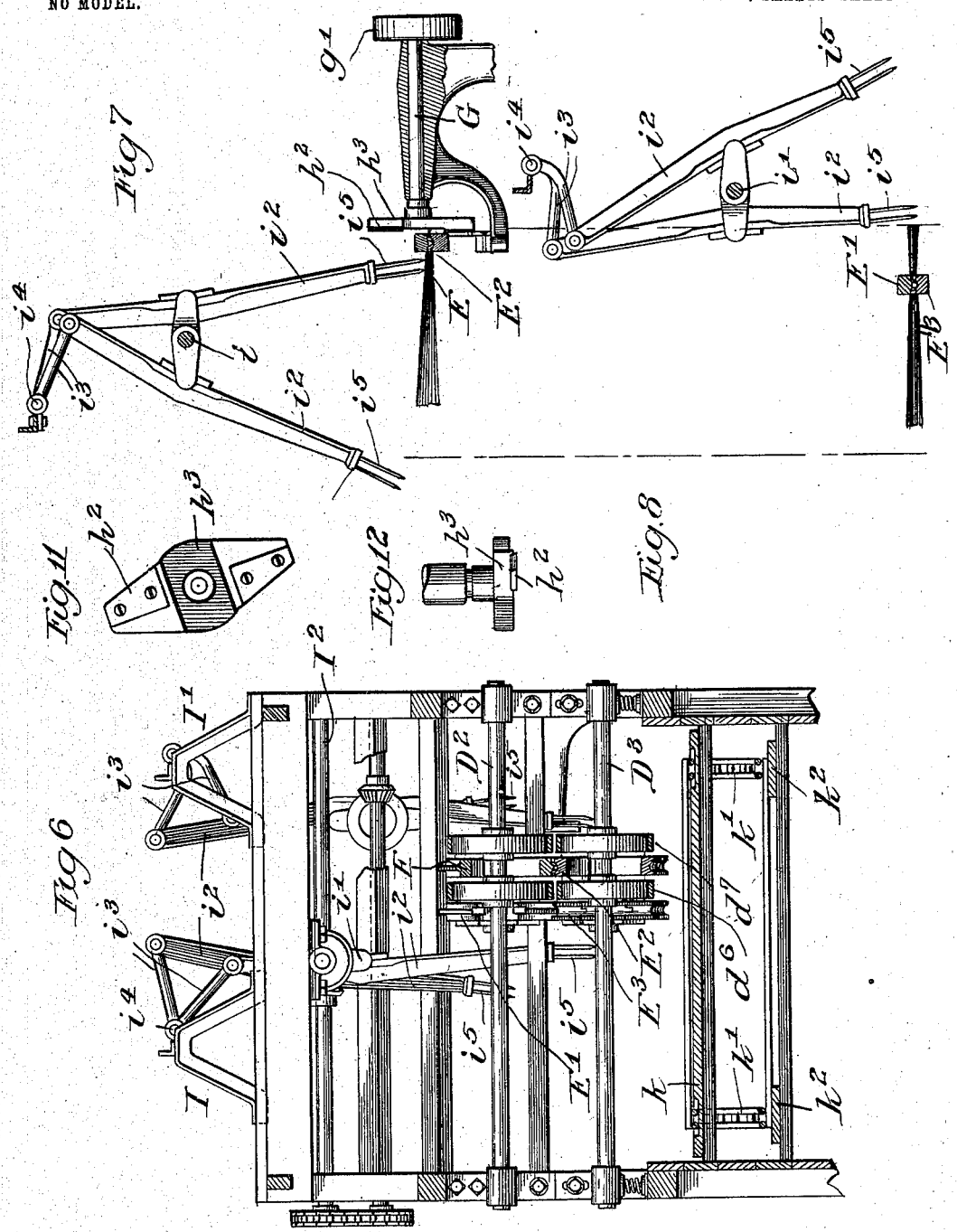

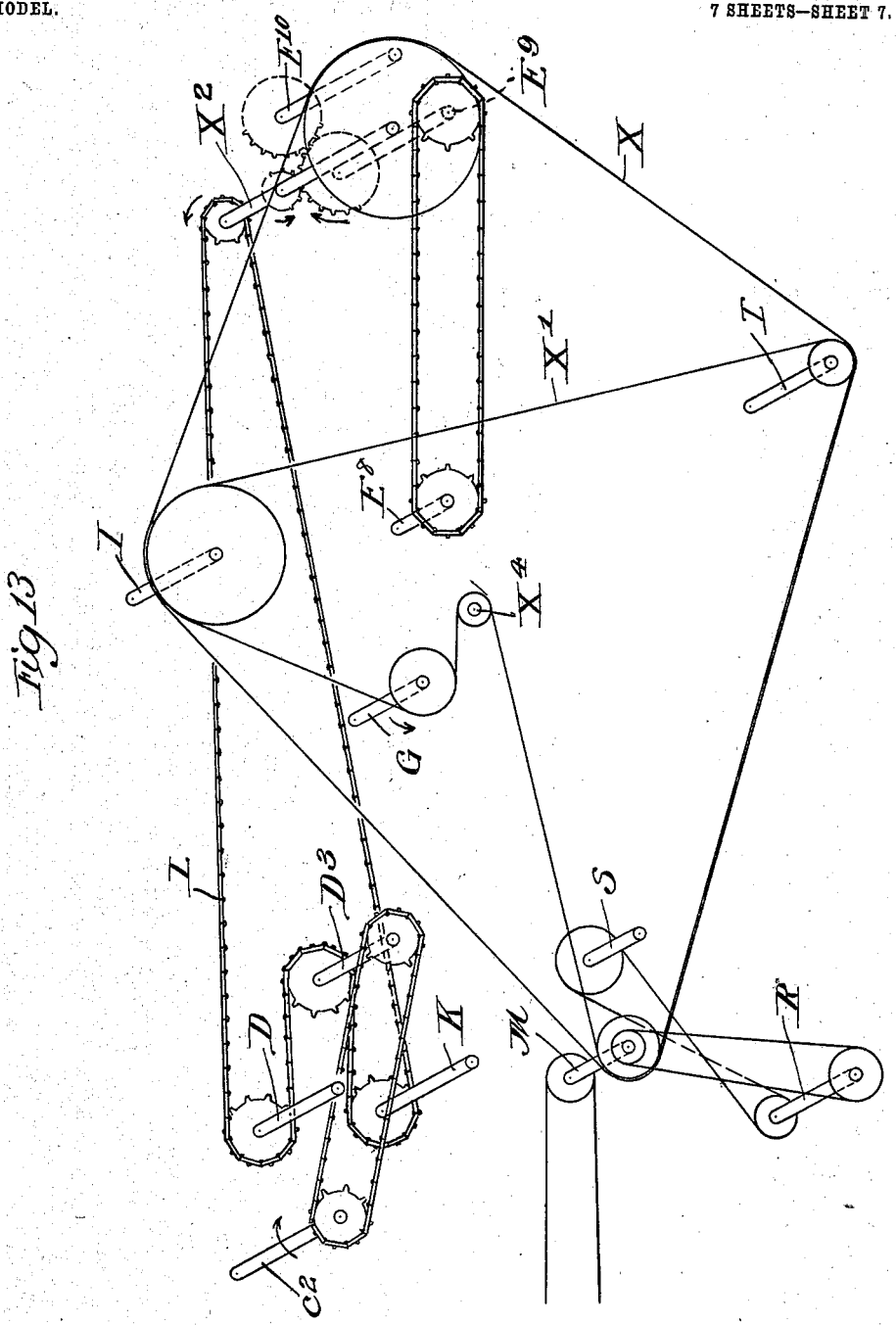

UNITED STATES PATENT OFFICE.

GEORGE H. ELLIS, OF CHICAGO, ILLINOIS, ASSIGNOR, BY MESNE ASSIGNMENTS, TO WILLIAM DEERING, OF EVANSTON, ILLINOIS.

FLAX-STRAW-PREPARING MACHINE.

SPECIFICATION forming part of Letters Patent No. 738,783, dated September 15, 1903.

Application filed August 1, 1902. Serial No. 117,924. (No model.)

*To all whom it may concern:*

Be it known that I, GEORGE H. ELLIS, of Chicago, in the county of Cook and State of Illinois, have invented an Improved Flax-Straw-Preparing Machine, of which the following is a full description, reference being had to the accompanying drawings.

The purpose of this invention is to receive flax-straw in bundles as formed by harvesting-machines, comb and clean the straw, sever the heads, bind and deliver the combed and cleaned straw in bundles, and thresh, clean, and deliver the seed from the tops and combings. The object in view, as is well known, in thus handling the straw is to avoid breaking and otherwise injuring it for fiber uses and at the same time have a capacity comparable to that of an ordinary grain-thresher.

Figure 1 is a right-hand side elevation of the machine; Fig. 2, a right-hand sectional elevation of the machine; Fig. 3, a plan view with combing-arms removed; Fig. 4, a sectional right-hand side elevation of the rear set of combs and parts that coöperate therewith. Fig. 5 is a right-hand side sectional elevation showing the mechanism provided for spreading the straw fed by the feeding-chain and by means of the conveying-belts passing it in the form of a continuous swath to the combing devices. Figs. 6, 7, and 8 are sectional end views showing the relative positions of the cleaning-forks with the straw-carrying chains, the cutter for severing the heads, and a pair of rollers for crushing the bolls of flax in the straw. Figs. 9 and 10 are detail views showing the construction of the trucks or antifriction-rollers against which bears the chain that conveys the swath of straw. Figs. 11 and 12 are detail views of the cutter-head. Fig. 13 shows the arrangement of the driving belts and chains. Fig. 14 shows details of crushing-rollers adjacent to the grasping and conveying chains; and Fig. 15 is a transverse section of the grasping-chain, showing the shape of two coöperating links.

My machine for convenience is mounted upon trucks adapted to support it steadily and render it portable. The frame for the various working parts may be of any form adapted to receive shaft-bearings and various other supports. Suffice it to say that the parts A represent the sills.

B is the housing for the working parts at the lower portion of the machine.

In order that the device may be best understood, it will be described in detail, beginning with the primary feeding devices.

C is the receiving-table, preferably upwardly inclined toward the machine, and mounted thereupon and passing over the upper surface thereof are the toothed endless feeding chains or belts $c$. This toothed belt is moved slowly by pulleys $c'$ on the shaft $c^2$. This shaft $c^2$ is given rotation by a chain $c^4$ thrown over the sprocket-wheel $c^5$, which sprocket-wheel may be given motion from any part of the machine, but preferably from the shaft $D^3$, as shown in Figs. 1, 2, and 3. Slots are provided in the table at its upper edge to receive the sprocket-wheels $c'$ and through which the toothed belt $c$ may recede. The purpose of these endless conveyers is to deliver the bundles of flax-straw to the spreading-wheel $d^8$ and the conveying-belts after they have been thrown on the feeding-table and their bands severed automatically or otherwise, and thus present a uniform flow of straw to the machine. The shaft $c^2$ is supported at each end on pillow-blocks, which are secured to the framework. A board $c^7$ is provided on the table C on the left-hand side, against which the head ends of the bundles are placed when feeding same to the machine.

Upon the framework supported in suitable bearings are the shafts D, D', $D^2$, and $D^3$, and upon each of these shafts are the two pulleys $d$, $d'$, $d^2$, and $d^3$, respectively, as shown in Figs. 2, 3, and 5. Around the pulleys $d$ and $d^2$ are thrown the two endless conveying-belts $d^4$ $d^5$, and around the pulleys $d'$ and $d^3$ are thrown the two similar opposing belts $d^6$ and $d^7$ $d^7$, being directly beneath and coöperating with the belt $d^5$, but not shown in drawings. In the same way the belts $d^4$ and $d^6$ coöperate. The shafts D' and $D^3$ are journaled in bearings which are spring-supported beneath, as shown in Fig. 6, thus admitting of a downwardly-yielding movement when an unusually heavy swath of straw passes between the said conveying-belts. Upon the shaft D is the toothed wheel $d^8$, as shown in Figs. 3 and 5. Concentric with the toothed wheel $d^8$ is the narrow concave $c^6$. As the straws of the loosened bundles are brought upward by the toothed chains $c$ they are engaged by the toothed wheel $d^8$ near their middles, which revolves in the direction indicated by the arrow in Fig. 1. By this wheel they are moved downward and fed between the conveying-belts $d^4$ and $d^5$ above and $d^6$ and $d^7$ below. By means of the toothed wheel and the belts the straws are formed into what may be regarded a swath.

E and E' are the upper loops, and $E^2$ and $E^3$ are the lower loops, of the grasping-chain, carried and driven by the special sprocket-wheels $E^0$. The loops E and $E^2$ are arranged in the same vertical plane and are adapted to coöperate, as hereinafter more fully set forth. The same arrangement also applies to the loops E' and $E^3$.

The grasping-chain is driven as follows: Through the belt X and suitable pulleys motion is communicated direct from the cylinder-shaft M to the shaft $X^2$, as shown in Figs. 2 and 13. By suitable gearing the shaft $X^2$ imparts motion to the shaft $E^9$, which in turn by gearing imparts synchronal rotation to the shaft $E^{10}$. The shafts $E^9$ and $X^2$ are journaled in suitable bearings on the frame, while the shaft $E^{10}$ journals in boxes which are secured to arms E, swinging from the center of the shaft $E^9$, and may be considered to be held rigidly by suitable means. Also journaled in bearings on the frame and lying in the same horizontal plane as the shaft $E^9$ are the shafts $E^8$, $E^7$, and $E^6$, while similarly located relative to the shaft $E^{10}$ are the shafts $E^5$ and $E^4$, also journaled in bearings on the frame of the machine. The shaft $E^{10}$ serves as the driving-shaft for the two upper loops E' and E of the grasping-chain through the instrumentality of the grasping-chain itself and the sprocket-wheels $E^0$, which are rigidly secured to the several shafts, the shaft $E^5$ of course carrying two sprocket-wheels, one for the forward loop E and one for the rearward loop E'. (Shown in Figs. 2 and 3.) The shaft $E^9$ drives the lower rear loop $E^3$ of the grasping-chain through the sprocket-wheel $E^0$, rigidly secured thereto, the forward end of said loop passing around a similar sprocket-wheel on the shaft $E^7$. As indicated in the drawings, Fig. 2, the lower loops of the grasping-chain overlap each other for a purpose hereinafter explained, leaving the lower forward loop $E^2$ to be independently driven. This is accomplished by a sprocket-chain passing around sprocket-wheels on the shafts $E^9$ and $E^8$, said sprocket-wheels and chain being located on the ends of the projecting shafts on the left-hand side of the machine, as shown in Fig. 3.

The shaft $E^6$, bearing the sprocket-wheel $E^0$, which carries the forward end of the loop $E^2$, is journaled in slidable boxes, the pull of the grasping-chain being counteracted by the springs F, connected to said slidable boxes and some fixed part of machine, so that by adjustment of these springs any desired degree of tension in the loop $E^2$ of the grasping-chain may be secured. The loops E and $E^3$ of the grasping-chain may be spring-tightened in the same manner, but are shown mounted in rigid bearings. The bearings in which journals the shaft $E^{10}$ are supported by swinging arms $E^{11}$, pivoted on the shaft $E^9$, as shown in Fig. 1. These arms $E^{11}$ are adjustably secured in position by means of the rearwardly-projecting arms $y$, integral with the bearings of the shaft $X^2$. The arms $y$ being provided with arcuate slots $y'$, which are adapted to receive bolts $y^2$ on the arms $E^{11}$, will permit the said arms to be swung rearwardly the desired amount and secured and in this way providing adjustment for the tension of the loop E'. Thus adjustment may be made when assembling for fitting the chains and further adjustment to prevent sagging and to compensate for wear. As the function of these loops of grasping-chain is to retain and convey the flax-staw while having the heads cut off and the straw combed and cleaned of weeds, grass-seed, bolls, and other undesirable material, then in order to insure a continuous and positive transmission of said flax-straw the two lower loops overlap each other, so that for a short space the flax-straw is engaged by the four loops of the said chain; also, in addition to the above-specified arrangement of the several loops the two forward loops E and $E^2$ operate in a vertical plane parallel with the plane of the two rear loops E' and $E^3$, but sufficiently removed that the straw will be grasped by the two latter loops at a new or combed portion of the stalks of flax-straw and leave the uncombed portion, which had been held between the first two loops, free to the subsequent action of the second set of combs.

It will be observed from an inspection of Figs. 1 and 2 that the ends of the upper and lower loops of the grasping-chain are not vertically coincident. The effect of such an arrangement is to avoid the interference of the long links as they pass around the sprocket-wheels $E^0$ by allowing the ends of the links to be either beyond a point where they will come in contact with the coacting chain or the end of said links will come in contact with a flexible portion of the said coacting loop of the grasping-chain. This grasping-chain consists of links of considerable length and width serrated on the surfaces which come in contact with the straw, as shown in Figs. 3 and 4 and in cross-section in Fig. 15. The links of the lower loops of the grasping-chain are preferably made with a double serration or what might be termed "two rows of teeth," longitudinally arranged and provided with a depression between them. The configuration of these links is clearly illustrated in Fig. 15, where $E^{20}$ represents a section of a link of an upper loop E or E' and $E^{30}$ represents an opposing link of a lower loop $E^2$ or $E^3$. $E^{21}$ is a tooth of the single-serrated row above and E³¹ are the teeth of the double-serrated row below, with the depression between. This depression receives the points of the single-serrated teeth in the links of the chain above, and thus form jaws which will afford a two-point support below and a one-point support above for the flax-straw lying between. The upper or engaging portion of the lower loops is held up rigidly in working position and also in alinement by a series of antifriction-rollers $e$, which journal on bearings secured to the bar $e'$, which is in turn rigidly connected to the frame of the machine, as shown in Figs. 1, 2, or 4. The lower or engaging portion of the upper loops is held yieldingly in working position and in contact with the engaging part of the lower loops by devices such as shown in Fig. 10. Here the rollers $e^2$ are journaled on a frame $e^3$, each frame supporting four rollers. Between the bars $e^4$ and $e^5$, Fig. 3, are riveted or otherwise secured a transverse connecting member $e^6$, as shown in Fig. 10. A bolt $e^7$, passing through a centrally-located hole in this member and upwardly through a corresponding hole in the frame $e^3$ and receiving a compression-spring $e^8$, serves to hold the frame $e^3$ in contact with the connecting member $e^6$ and yet permit an upward movement if pressure is applied in that direction. The opening in the frame $e^3$ is made somewhat larger than the bolt $e^7$ in order to admit of a slight longitudinal rocking movement of the said frame. The bolt $e^7$ is provided with a nut and washer to bear against the spring. By adjustment of the nuts on the bolts $e^7$ on each of the frames bearing the antifriction-rollers $e^2$ any desired degree of pressure can be obtained between the engaging portions of the several loops of grasping-chain, and in this way the flax-straw or material operated upon can be held firmly between the serrated links of the coöperating loops of the grasping-chain. The force which these springs exert to press the links of the upper loop upon those of the lower loop operates not so much by the direct pressure between them to retain the flax-straw as by the wedging action of the straws between the adjacent teeth and not the opposing teeth.

Located in suitable bearings on the frame is the cutter-shaft G, carrying the rotary cutter $h^3$, as shown in Figs. 3 and 7 and the cutter-head in detail in Figs. 11 and 12. This rotary cutter is arranged to engage and sever the heads of the flax-straw as it passes between the loops E and E² of the grasping-chain. The cutter-shaft G is driven by the pulley $g'$, secured to said shaft and engaging with the belt X', the location being shown in Figs. 2 and 3 and the method of driving in Figs. 2 and 13. The detail construction of the cutting-head is shown in Figs. 11 and 12, where $h^2$ $h^2$ represent the cutting blades or knives, secured by bolts or otherwise to the head-piece $h^3$, which in turn is rigidly secured to the cutter-shaft G. As shown by the drawings the cutting edges of the blades $h^2$ $h^2$ project somewhat from and in advance of the arms of the head-piece $h^3$, so that when rotated at a high speed the straw carried against the cutter by the grasping and conveying chains will have its heads severed when passing the said cutter.

H H, Figs. 3 and 14, represent a pair of rollers secured to the shafts $h$ $h$. They may be driven by a sprocket-chain thrown around a sprocket-wheel $h'$ on the lower shaft $h$ and a sprocket-wheel on the shaft E⁸ or some other suitable driving-shaft. The line of contact of the two rollers is substantially in the same horizontal plane as the layer or swath of flax passing between the two rear loops of the grasping-chain, and the rollers are arranged, as shown by Figs. 3 and 14, to engage the end of the swath of flax-straw from which the heads have been cut and crush any remaining flax-bolls that may have been left therein. It will be observed by inspection of Fig. 3 that the above-mentioned rollers are placed near the forward end of the rear loop of the grasping-chain, so that they will operate upon the straw before it passes to the second set of combs, thus allowing the straw to be combed after the seed-bolls have been crushed.

The combs I and I' are clearly shown in Figs. 1, 2, and 4 and in detail in Figs. 7 and 8. These combs are arranged in two sets, a forward set I, adapted to operate upon the butts of the flax as it passes between the two forward loops, and the rear set I', adapted to operate upon the opposite end of the straws of the swath as it passes between the two rear loops. As before explained, the forward loops and rearward loops operate in planes slightly removed from each other, so that the combs will in the two operations clean the entire length of the stalks. These two sets of combs I and I' are driven by crank-shafts $i$ and $i'$, respectively, longitudinally arranged with respect to the frame of the machine. The transverse shaft I² through a bevel-gear and pinion transmits motion to the crank-shaft $i$, and through means of sprocket-wheels and chain $i^6$, a secondary shaft $i^7$, gear $i^8$, and pinion $i^9$ motion is imparted to the crank-shaft $i'$, as shown in Figs. 1, 2, and 4. The transverse shaft I² is driven by the pulley I³ on same, engaging with driving-belts X and X', Figs. 1 and 13. The crank-shafts $i$ and $i'$ are mounted in suitable bearings on the upper portion of the frame and are preferably four-throw, the cranks being arranged opposite. In the wrist of each crank-journal is pivotally mounted the lever $i^2$, the longer part of the lever being below the journal. On the end of the upward extension of the lever $i^2$ is pivoted an arm $i^3$, the other end being pivoted to a fixed support $i^4$. To the lower or long end of these levers $i^2$ are secured the combing-teeth $i^5$, consisting of two rows of round sharp-pointed teeth, or they may be made of thin flat plates with the edges sharpened and tapering to a point below, while the line of advance lies in the plane of the teeth or plates. This arrangement of the comb-arms and comb-teeth will permit the teeth to be inserted in the straw very close to the grasping-chain and drawn downward and away from same, thus cleaning and combing the straw and yet not breaking it.

Arranged at the delivery end of the machine and adapted to receive the headless and combed flax-straw from the grasping-chain is the automatic binder J, driven by means of a sprocket-chain connection with the shaft $E^9$, as shown in Fig. 1. The flax-straw is delivered on the binder-table $j$ of the binder J from the grasping-chain, and the binding operation is in all respects like that on the ordinary harvester, the flax being bound in bundles and delivered to the rear of the machine.

Shown in Fig. 2 extending transversely the width of the machine and longitudinally almost the entire length is the platform $k$. At the forward end of this and slightly below is a roller secured to the shaft K, and similarly located at the rear end is a roller secured to the shaft K'. Both the shafts K and K' journal in bearings secured to the main frame. A sprocket-wheel concentric with the shaft K and secured to same engages with the sprocket-chain L, which will be more fully described later. Over the rollers in these two shafts K and K' passes the endless conveyer $k'$, consisting of a sprocket-chain provided with projections or ears to which are secured slats, and the conveyer roller-shafts being provided with sprocket-wheels to engage said chain. Through the sprocket-chain L and its engaging sprocket-wheel on the shaft K the shaft K, the roller secured thereto, and the conveyer $k'$ are driven, the conveyer-slats sliding forward over the top of the platform $k$ and the slack side of the conveyer being supported in its return by the slide $k^2$. It is obvious, of course, that were the cylinder placed in a position adapted to receive the tops direct from the cutter $h^3$ then it would be possible and practical to dispense with the conveying mechanism. It will thus be seen that all the combings, cleanings, tops, and seeds that fall from the cutter $g$, the combs I and I', and the rollers H H will fall down upon the platform $k$ and be moved by the endless conveyer $k'$ to the forward end of said platform and delivered over its end for the subsequent crushing, threshing, and cleaning, which will now be described.

The cylinder-shaft M of the threshing-cylinder $m$ is journaled in bearings rigidly secured to the frame of the machine, the location being at the forward end, slightly in advance of the shaft K and some distance below, or in such a position as to adapt it to receive the material delivered from the conveyer $k'$. The threshing-cylinder, as is usual in this class of machines, receives its power directly from the outside source. The construction of the cylinder, briefly stated, is as follows: Secured to the cylinder-shaft at either end and within the frame are the cylinder-heads, to which the bars—ten in number in this instance—are secured. To these bars are secured ribbed plates, the ribs extending at opposite angles to the axis of cylinder on alternate bars, following a type well known. The two sets of cylinder-concaves N N are located directly beneath the cylinder and consist of a series of light bars bolted together and teeth or lugs on these bars to hold them at some distance apart. This presents, therefore, a broken concave surface to coöperate with the cylinder and sufficiently open to permit the seeds from the broken flax-bolls to pass through. As I claim nothing novel in this cylinder and its concaves, the general description just given will be sufficient for these parts.

The description of other features used in my invention, necessary but not new—such as the fan, blower, riddles, agitator, &c.—will be treated in the same general way.

The boards $n$ and $n^2$, extending from the concaves N upwardly and forwardly, serve to close the forward end of the machine and deflect the material thrown by the conveyer $k'$ to the pair of rollers O O' and the cylinder $m$. This pair of rollers O O' are so situated as to operate upon this material thrown by the conveyers just before it enters the cylinder and crush the bolls, thus rendering more effective the subsequent action of the cylinder and other parts operating to separate the flax-seed from the straw. These rollers O and O', journaled in bearings on the main frame and driven from the shaft D or some other convenient shaft, may be provided with longitudinal grooves and elevations to increase their efficiency, if desired, the elevations in one roller adapted to mesh with a groove in the corresponding roller, thus insuring a more effective breaking up of the flax-bolls. In passing through the rollers O O' and the cylinder $m$ most of the seeds are separated from the straw, the seeds dropping through the cylinder-concaves N N down to the riddles P and the straw containing unseparated seed being delivered from the cylinder to the agitators S. The stop $n'$, similar to $n$ and $n^2$, deflects the seed and other fine material from below the cylinder and concaves to the riddles P.

Forward of and slightly below the riddles P is the fan $r$, suitably incased and secured to the fan-shaft R. The fan-shaft R is driven by means of belt-and-pulley connection with the cylinder-shaft M. The riddles or sieves P are given a reciprocatory movement by the eccentric-rods $r'$, actuated by eccentrics on the fan-shaft R. The riddles, preferably three in number, are arranged with the coarsest sieves above and the finest below, the rear end sloping slightly downward. The rear ends of the agitators S are mounted on rocking arms $s'$ and are slightly higher than the front end. The forward ends of the agitators S journal on and are supported by a crank-shaft S', the cranks being alternately opposite. The crank-shaft S', journaled in bearings on the main frame, is driven by a cross-belt and suitable pulleys from the fan-shaft R. The motion of the upper agitators being to the rearward, as is usual where such devices are used, the effect will be for the teeth above to work all material delivered thereon to the rear end, while the seed and fine substance contained therein will drop to the fixed table $s^2$ and be worked to the forward end of said table by the teeth on the lower side of the agitators. Here it will fall to the riddles P, where it is further cleaned and separated. A blast of air from the fan passes through the riddles, as is customary in threshing-machines, to assist in the cleaning and separating process. The cleaned seed passes through the several riddles, drops to the inclined surface $p$ below, and eventually to the inclined trough $p'$, from which it flows into any receptacles prepared to receive it. The uncleaned seed passing over the riddles and dropping into the trough $p^2$ will by suitable means, which need not be shown or described, since it is common to all such machines, be taken and delivered on the platform $k$ of the conveyer $k'$ and from there through the machine again as before. The coarse and waste part operated upon, therefore, is finally delivered to the blower T from the riddles P or from the agitators S, that delivered from the agitators dropping from the rear end of same upon the incline $M^2$, and thus down to the blower. From the blower it may be delivered anywhere in the rear of the machine or on either side by the pipe $t$, which may be made flexible.

In connection with the foregoing description of the various parts of the machine and the following appended claims it is to be understood that the term "feeding device" is intended to comprehend the receiving-table C, the toothed endless chain or belt $c$, mounted thereon, the spreading-wheels $d^3$, and the conveying-belt $d^4$ $d^5$ $d^6$ $d^7$, all of these elements or enough thereof to constitute operative means for presenting the straw to the grasping-chain. The term "cleaning mechanism" is to be understood as including the combs, the head-severing rotary cutter $g$, and the crushing-rollers H H. The threshing mechanism covers the cylinder $m$, the cylinder-concave M M, the rollers O O', the riddles P, the agitators S, the fan $r$, the blower T, and their associated detail parts. The grasping-chain is regarded as an element distinct from but associated with the cleaning mechanism, its function being to receive the straw from the feeding device, hold it while being operated upon, and convey it to and from the several elements of the cleaning mechanism.

Briefly stated, the operation of the machine is as follows: The bundles of flax are thrown upon the receiving-table C, where the bands are severed and the bundle somewhat spread over the feeding chain or belt $c$, with the heads of flax abutting against the board $c^7$. The feeding-chain $c$ then engages the bundle of straw, conveying it to the toothed spreading-wheel $d^3$, which delivers it uniformly to the conveying-belts $d^4$, $d^5$, $d^6$, and $d^7$. These conveying-belts deliver the straw in a continuous swath to the grasping and conveying chains E, E', $E^2$, and $E^3$, which retain it and convey it to the rear end of the machine, where it is delivered to a binding attachment that rebinds the straw into bundles. While held in the grasp of these chains the straw is cleaned and combed, the heads are severed, and the remaining bolls in the top part of the straw are crushed by means of the two sets of combs I and I', the cutter $g$, and rollers H H described. The tops, combings, and cleanings fall to the platform $k$, where the conveyer $k'$ conveys this material to the forward end of the said platform $k$ and delivers it to the crushing-rollers O O' and the cylinder $m$. After passing through the said rollers and cylinder the crushed and threshed material passes to the agitators S and the riddles P, the coarse portion passing to the agitators and the seed and finer portion passing direct to the riddles. The agitators operate to separate the seed from the threshed straw, the seed working back to the forward end of the table beneath the agitators and falling down on the riddles P. The seed is shaken through the riddles P and eventually to the trough $p'$, from which it is delivered into suitable receptacles. The coarse straw or tops drop from the rear end of the agitators S on the platform $M^2$, where, with the chaff, &c., blown from the material passing through the riddles by the fan $r$, it is taken up by the blower T and delivered through the pipe $t$ to any desired place. The coarse or uncleaned portion of the threshed material which does not find its way through the riddles and is not blown away by the fan drops into the trough $p^2$, from where it is taken by any suitable means and delivered upon the platform $k$ to be again operated upon by the threshing and cleaning mechanism.

What I claim as my invention, and desire to secure by Letters Patent, is—

1. In a flax-straw-preparing machine, an automatic feeding device, grasping and conveying chains, and reciprocating combs, all combined substantially as described.

2. In a flax-straw-preparing machine, an automatic feeding device, grasping and conveying chains, and alternate reciprocating combs adapted to operate on the opposite ends of the flax-straw held in the grasping-chain, all combined substantially as described.

3. In a flax-straw-preparing machine, an automatic feeding device, grasping and conveying chains, combs and a cutter adapted to sever the heads from the flax-straw, all combined substantially as described.

4. In a flax-straw-preparing machine, an automatic feeding device, grasping and conveying chains, combs and a rotary cutter, said combs and rotary cutter located adjacent to the grasping and conveying chains, all combined substantially as described.

5. In a flax-straw-preparing machine, an automatic feeding device, grasping and conveying chains and a cutter, all combined substantially as described.

6. In a flax-straw-preparing machine, an automatic feeding device, grasping and conveying chains, two sets of combs and a pair of crushing-rollers located adjacent to the forward end of the rear loops of the said grasping and conveying chains and adapted to operate upon the ends of the straw from which the heads have been severed subsequent to the action on same of the cutter and prior to the operation of the second set of combs, all combined substantially as described.

7. In a flax-straw-preparing machine, an automatic feeding device, grasping and conveying chains, a cutter and a pair of crushing-rollers, both cutter and rollers being located adjacent to the said grasping and conveying chains, all combined substantially as described.

8. In a flax-straw-preparing machine, an automatic feeding device, grasping and conveying chains, a cutter, and a pair of crushing-rollers, both cutter and crushing-rollers being located adjacent to the said grasping and conveying chains, on the same side of said chains, and the arrangement being such that the operation of the rollers is subsequent to that of the cutters, all combined substantially as described.

9. In a flax-straw-preparing machine, an automatic feeding device and grasping and conveying chains consisting of four or more loops, the forward loops arranged in a vertical plane slightly removed from the vertical plane of the rearward loops, all combined substantially as described.

10. In a flax-straw-preparing machine, an automatic feeding device and grasping and conveying chains consisting of a series of loops which coöperate by the lower run of one loop and the upper run of the adjacent loop engaging the straw operated upon, all combined substantially as described.

11. In a flax-straw-preparing machine, an automatic feeding device, and grasping and conveying chains consisting of a series of coöperating loops, the engaging portion of the loops being held together with springs and the links of said loops bearing against antifriction-rollers, all combined substantially as described.

12. In a flax-straw-preparing machine, an automatic feeding device, grasping and conveying chains, a head-severing device, and straw-cleaning mechanism consisting of two sets of reciprocating combs of four levers in each set, the comb-levers being mounted on a four-throw shaft longitudinally arranged with respect to the machine, the cranks alternately opposite, the upper end of the comb-levers pivotally connected to oscillating arms, and the lower end of said levers carrying the combing-teeth and the two sets of combs adapted to operate upon the opposite ends of the straw held in said grasping and conveying chains, all combined substantially as described.

13. In a flax-straw-preparing machine, grasping and conveying chains, combs, a rotary cutter and crushing-rollers, all located adjacent to the said grasping and conveying chains, all combined substantially as described.

GEORGE H. ELLIS.

Witnesses:
J. C. WARNES,
EDW. R. BARRETT.